(No Model.)
S. P. MASON.
DITCHING MACHINE.
No. 309,638. Patented Dec. 23, 1884.
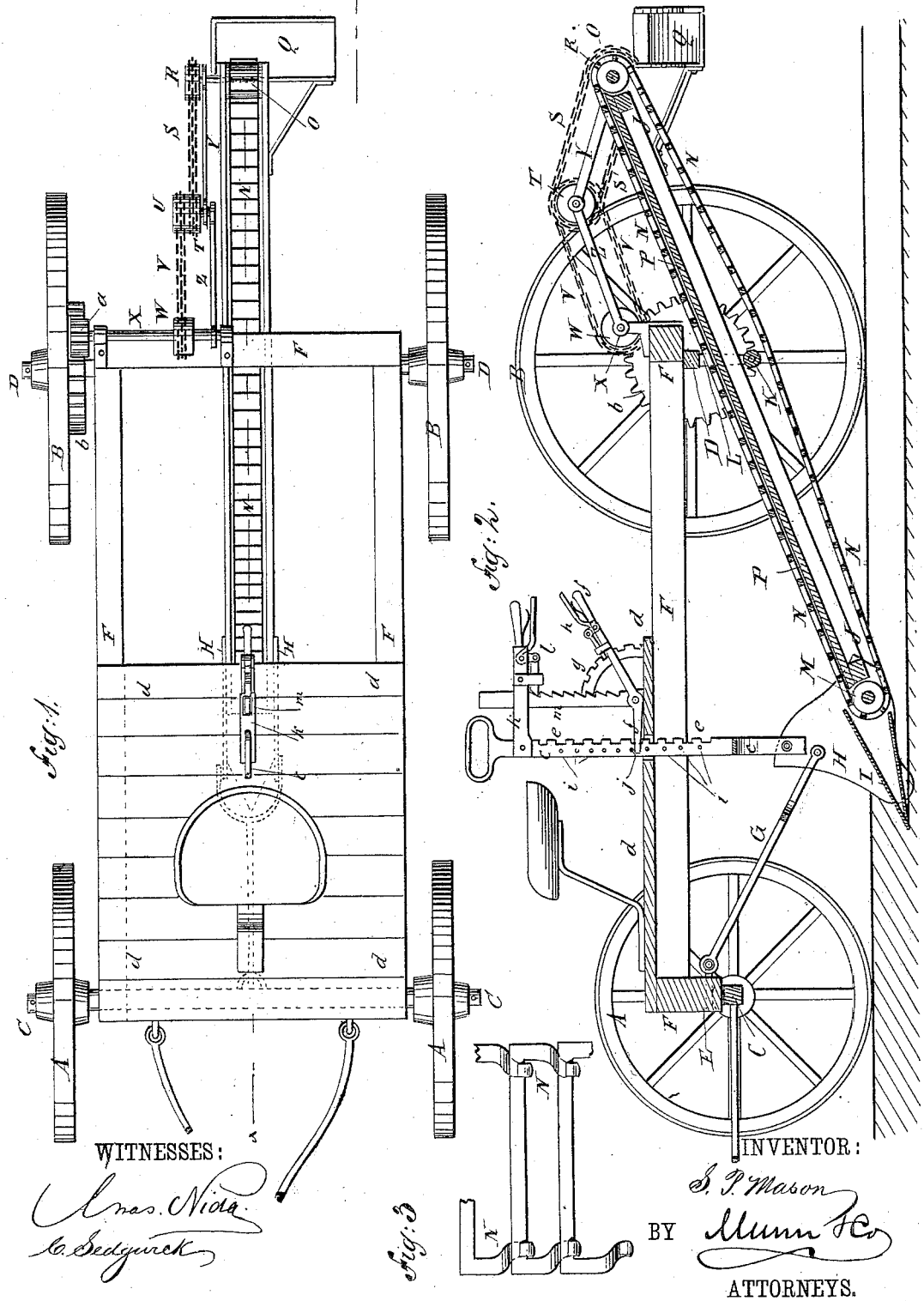
WITNESSES:
INVENTOR:
S. P. Mason
BY Munn & Co
ATTORNEYS.

UNITED STATES PATENT OFFICE.

SAMUEL P. MASON, OF NEW VIENNA, OHIO.

DITCHING-MACHINE.

SPECIFICATION forming part of Letters Patent No. 309,638, dated December 23, 1884.

Application filed May 16, 1884. (No model.)

*To all whom it may concern:*

Be it known that I, SAMUEL P. MASON, of New Vienna, in the county of Clinton and State of Ohio, have invented a new and useful Improvement in Ditching-Machines, of which the following is a full, clear, and exact description.

Reference is to be had to the accompanying drawings, forming a part of this specification, in which similar letters of reference indicate corresponding parts in all the figures.

Figure 1 is a plan view of one of my improved ditching-machines. Fig. 2 is a sectional side elevation of the same, taken through the line $x\ x$, Fig. 1. Fig. 3 is a plan view of a part of the endless chain of the elevator.

The object of this invention is to facilitate the opening of tile-ditches, and promote convenience in regulating and controlling ditching-machines.

The invention consists in the construction and arrangement of parts, as will be hereinafter fully described and claimed.

A are the forward wheels, and B are the rear wheels. C is the forward axle, and D is the rear axle. E is the forward bolster, to which is attached the forward end of the frame F. The rear end of the frame F is attached to the rear axle, D.

To the forward bolster, E, is hinged, by an eyebolt or other suitable means, the forward end of the draw-bar G, the rear end of which is forked, and is pivoted by rivets, bolts, or other suitable means to the side cutters, H.

To and between the side cutters, H, is secured, by rivets or bolts, the share I, by which the slice of soil is raised from the bottom of the ditch. The lower parts of the forward ends of the side cutters, H, extend a little lower than the edge of the share I, so that the sides of the ditch will be cut down squarely to its bottom.

To the rear ends of the side cutters, H, is pivoted the forward end of the elevator-frame J, which rests upon a roller, K, pivoted to hangers L, attached to the rear axle, D.

To the forward end of the elevator-frame J, and between the side cutters, H, is pivoted a chain-wheel, M, in such a position as to be below the upper part of the rear end of the share I, so that the soil raised by the said share will pass readily to the elevator. Around the chain-wheel M passes an endless chain, N, which also passes around a corresponding chain-wheel, O, pivoted to the upper end of the frame J. The endless chain N is formed of bars having hooks formed upon or attached to their ends to engage with the adjacent bars, as shown in Fig. 3.

To the elevator-frame J, beneath the upper part of the endless chain N, is attached an apron, P, up which the soil is carried by the bars of the endless chain N. From the upper end of the elevator the soil falls into an inclined chute, Q, down which it slides to the ground at the side of the ditch. The inner end of the chute Q is attached to the upper end of the elevator-frame J, and the said chute is made of such a length as to deposit the soil upon the ground between the side of the ditch and the wheels of the machine, so that the said soil can be readily thrown back into the ditch after the tiles have been laid.

To a journal of the upper chain-wheel, O, is attached a chain-wheel, R, around which passes an endless chain, S. The endless chain S also passes around a chain-wheel, T, with which is rigidly connected a chain-wheel, U.

Around the chain-wheel U passes an endless chain, V, which also passes around a chain-wheel, W, attached to the shaft X. The chain-wheels T U revolve upon a pivot attached to the forward end of a bar, Y, the rear end of which is pivoted to the journal of the chain-wheels O R.

To the journal of the chain-wheels T U is pivoted the rear end of the bar Z, the forward end of which is pivoted to the shaft X. With this construction the elevator can be raised and lowered without affecting the operation of its driving mechanism. The shaft X revolves in bearings attached to the rear cross-bar of the frame F, and to its outer end is attached a gear-wheel, $a$, the teeth of which mesh into the teeth of a larger gear-wheel, $b$, attached to the wheel B, so that the elevator will be operated by the advance of the machine.

To the upper parts of the side cutters, H, is attached the forked lower end of a bar, $c$, which passes up through a hole in the platform $d$, attached to the forward part of the frame F. A lever, $f$, is pivoted at an angle to a support attached to the platform $d$. The outer arm of the lever $f$ moves along a curved catch-bar, g, attached to the platform d, and with the teeth of which engages a spring lever pawl, h, connected with the said outer arm of the said lever.

In the bar c are formed a number of holes, i, or teeth e, to receive a pin or bar, j, to limit the descent of the said bar c, and which will also serve for the lever f to operate upon.

To the upper part of the bar c is attached an arm, k, to the outer part of which is attached a spring lever pawl, l, to engage with the ratchet-teeth of an upright bar, m, attached at its lower end to the platform d, to support the bar c and its attachments while the lever f is being moved back for another stroke. With this construction the cutters and shares can be adjusted to work at any desired depth in the ground, and can be readily raised and lowered to regulate the grade of the ditch.

Having thus described my invention, I claim as new and desire to secure by Letters Patent—

1. In a ditching-machine, the combination, with the side cutters, H, and the share I, of the bar c, the lever f, adapted to engage said bar c with its short arm, and having pawl h, the arm k, having pawl l, and the catch-bars g m, substantially as herein shown and described, whereby the said side cutters and share can be readily adjusted and controlled, as set forth.

2. The combination, with the frame F and the pivoted elevator-frame J, share I, and side cutters, H, of the vertical apertured bar c, secured at its lower end to the side cutters, H, and passing upward through the platform of frame F, pivoted elbow-lever f, engaging said bar c with its short arm, and provided on its long arm with a locking-pawl, catch-bar g, for the pawl to engage, and the pin i, adapted to be passed into one of the apertures in bar c, to limit its descent, substantially as set forth.

SAMUEL P. MASON.

Witnesses:
MATTHEW LEEKA,
S. L. PITGER.